United States Patent
Hasegawa et al.

(10) Patent No.: US 8,328,274 B2
(45) Date of Patent: Dec. 11, 2012

(54) CABIN APPARATUS FOR MOVING VEHICLE

(75) Inventors: Koichi Hasegawa, Kobe (JP); Kenji Morikane, Tondabayashi (JP)

(73) Assignee: Kubota Corporation, Osaka (JP)

( * ) Notice: Subject to any disclaimer, the term of this patent is extended or adjusted under 35 U.S.C. 154(b) by 95 days.

(21) Appl. No.: 12/243,479

(22) Filed: Oct. 1, 2008

(65) Prior Publication Data

US 2009/0115225 A1 May 7, 2009

(30) Foreign Application Priority Data

Nov. 5, 2007 (JP) ................................ 2007-287424

(51) Int. Cl.
*B61D 17/00* (2006.01)

(52) U.S. Cl. .................... 296/203.01; 180/371; 280/781

(58) Field of Classification Search ................. 296/35.2, 296/35.1, 190.01, 190.08, 190.03, 203.01; 180/371, 89.12; 280/781; 267/136, 141
See application file for complete search history.

(56) References Cited

U.S. PATENT DOCUMENTS

| | | | | |
|---|---|---|---|---|
| 2,142,173 A * | 1/1939 | Broluska | ...................... | 280/788 |
| 2,213,010 A * | 8/1940 | Macpherson | ............ | 296/203.01 |
| 3,656,799 A | 4/1972 | Malm et al. | | |
| 3,781,058 A | 12/1973 | Ziolko et al. | | |
| 3,831,704 A | 8/1974 | Zuege | | |
| 3,990,737 A * | 11/1976 | Palmer | ......................... | 296/35.1 |
| 4,049,294 A * | 9/1977 | Atherton | ....................... | 280/756 |
| 4,161,991 A * | 7/1979 | van der Lely | ................ | 180/53.7 |
| 4,271,921 A | 6/1981 | Ochsner | | |
| 4,283,087 A * | 8/1981 | Kauss et al. | ............. | 296/190.07 |
| 4,638,878 A * | 1/1987 | Komp | ......................... | 180/89.13 |
| 4,650,242 A * | 3/1987 | Obe et al. | ................. | 296/190.08 |
| 6,056,077 A * | 5/2000 | Kobayashi | .................... | 180/216 |
| 6,206,121 B1 * | 3/2001 | Michel | ........................ | 180/89.13 |
| 6,752,228 B2 * | 6/2004 | Aoyama et al. | ............ | 180/89.12 |
| 6,910,731 B2 * | 6/2005 | Albright et al. | .......... | 296/190.05 |
| 7,144,040 B2 * | 12/2006 | Kiehl et al. | .................... | 280/785 |
| 7,364,223 B2 * | 4/2008 | Mori et al. | ............... | 296/190.07 |

FOREIGN PATENT DOCUMENTS

| | | |
|---|---|---|
| ES | 425571 A1 | 6/1976 |
| ES | 8105655 A1 | 9/1981 |
| JP | 53-100620 U1 | 8/1978 |
| JP | 56-021281 U1 | 2/1981 |
| JP | 56-033718 U1 | 4/1981 |
| JP | 57037074 | 3/1982 |
| JP | 57-130722 U1 | 8/1982 |
| JP | 518942 | 3/1993 |
| JP | 5-071501 U1 | 9/1993 |
| JP | 635748 | 9/1994 |
| JP | 8118972 | 5/1996 |
| JP | 2002002548 | 1/2002 |

* cited by examiner

*Primary Examiner* — Glenn Dayoan
*Assistant Examiner* — Pinel Romain
(74) *Attorney, Agent, or Firm* — The Webb Law Firm

(57) ABSTRACT

A cabin apparatus for a work vehicle provided with rear axle cases includes: a cabin frame having a top frame; a bottom frame; a pair of left and right front braces; a pair of left and right rear braces; a pair of left and right mounting braces extending downward from the rear part of the bottom frame; and a pair of left and right mounting plates provided respectively to the bottom ends of the pair of left and right mounting braces and protruding outward to the left and right. The pair of left and right mounting plates is fixedly mounted to the respective left and right rear axle cases in order to support the rear part of the cabin frame on a vehicle body of the work vehicle.

8 Claims, 17 Drawing Sheets

CABIN APPARATUS FOR MOVING VEHICLE

BACKGROUND OF THE INVENTION

1. Field of the Invention

The present invention relates to a cabin apparatus for a tractor or other moving vehicle.

2. Description of the Related Art

Examples of cabin apparatuses for tractors or other moving vehicles include those that comprise a cabin frame in which a top frame and a bottom frame are connected by a pair of left and right front braces and a pair of left and right rear braces, and a pair of left and right mounting braces protrudes downward from the rear part of the bottom frame (for example, Japanese Laid-open Patent Application No. 8-118972, Japanese Examined Utility Model Application No. 6-35748, and Japanese Examined Utility Model Application No. 5-18942). In this type of conventional cabin apparatus for a moving vehicle, the left and right sides of the bottom end at the front of the cabin apparatus are suspended via vibration-proof members on a support that protrudes outward to a front part of a transmission case or a clutch housing, and the left and right sides of the bottom end at the rear of the cabin apparatus are fixedly mounted via vibration-proof members on mount stands mounted to rear axle cases, whereby the rear side of the cabin apparatus is supported on the vehicle body.

However, in conventional practice, since the bottom end at the rear of the cabin apparatus is fixedly mounted to the rear axle cases via vibration-proof members within the transverse width of the cabin, the rear side of the cabin apparatus becomes unstable, and there is a danger that the cabin apparatus will vibrate or even swing widely to the left or right. To ensure strength of the cabin apparatus and to the cabin frame, the only methods that have been used was to increase the strength of the pair of left and right mounting braces, to widen the space between the pair of left and right mounting braces, or to raise the installed position of the cabin apparatus. Particularly in cases in which the cabin apparatus has been formed (narrowed) so as to reduce the transverse width, the transverse installation width of the rear side of the cabin apparatus has decreased, and there have been problems in that the cabin apparatus could not be installed stably.

In view of the problems described above, the present invention was designed so that a cabin apparatus could be installed stably even in cases in which the cabin apparatus is formed so as to reduce the transverse width.

SUMMARY OF THE INVENTION

The cabin apparatus for a work vehicle according to the present invention is characterized in comprising a cabin frame in which a top frame and a bottom frame are connected by a pair of left and right front braces and a pair of left and right rear braces, and a pair of left and right mounting braces extends downward from the rear part of the bottom frame; wherein a pair of left and right mounting plates protruding outward to the left and right is provided to the bottom ends of the pair of left and right mounting braces, and the pair of left and right mounting plates is fixedly mounted on respective left and right rear axle cases of the work vehicle, whereby the rear side of the cabin frame is supported on the vehicle body of the work vehicle.

In the configuration described above, it is preferred that vibration-proof members having elasticity be provided, and that the pair of left and right mounting plates be fixedly mounted on the respective left and right rear axle cases via the vibration-proof members.

In the configuration described above, it is also preferred that a pair of left and right stopper pieces be provided, and that the stopper pieces protrude from the sides of the rear axle cases toward the mounting plates and restrain vertical vibration of the mounting plates.

In the configuration described above, it is also preferred that the outer end sides of the pair of left and right mounting plates overlap the tires of the vehicle wheels in the transverse direction, and that the outer end sides also be fixedly mounted on the respective left and right rear axle cases.

According to the present invention, since a pair of left and right mounting plates protruding outward to the left and right is provided to the bottom ends of a pair of left and right mounting braces, and the outer end sides of the pair of left and right mounting plates are fixedly mounted on respective left and right rear axle cases so that the rear part of the cabin frame is supported on the vehicle body, the transverse installation width for the rear side of the cabin apparatus can be widened; and even if the transverse width of the cabin apparatus is formed to be narrow, the rear side of the cabin apparatus can be prevented from vibrating or swinging widely to the left or right, and the cabin apparatus can be installed stably.

KEY

Figure 1:
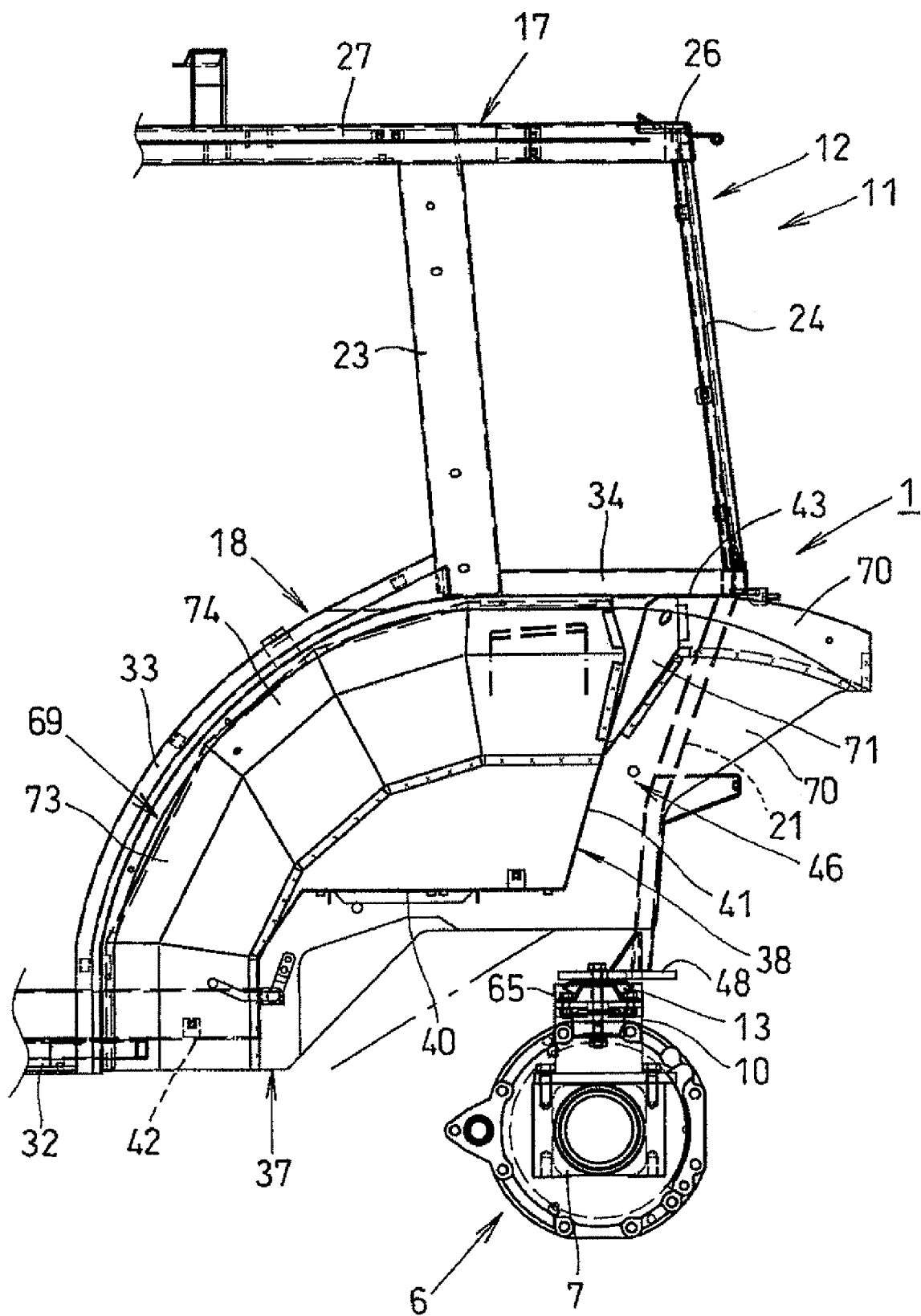
FIG. 1 is a side view of the rear part of a tractor showing an embodiment of the present invention.
Figure 2:
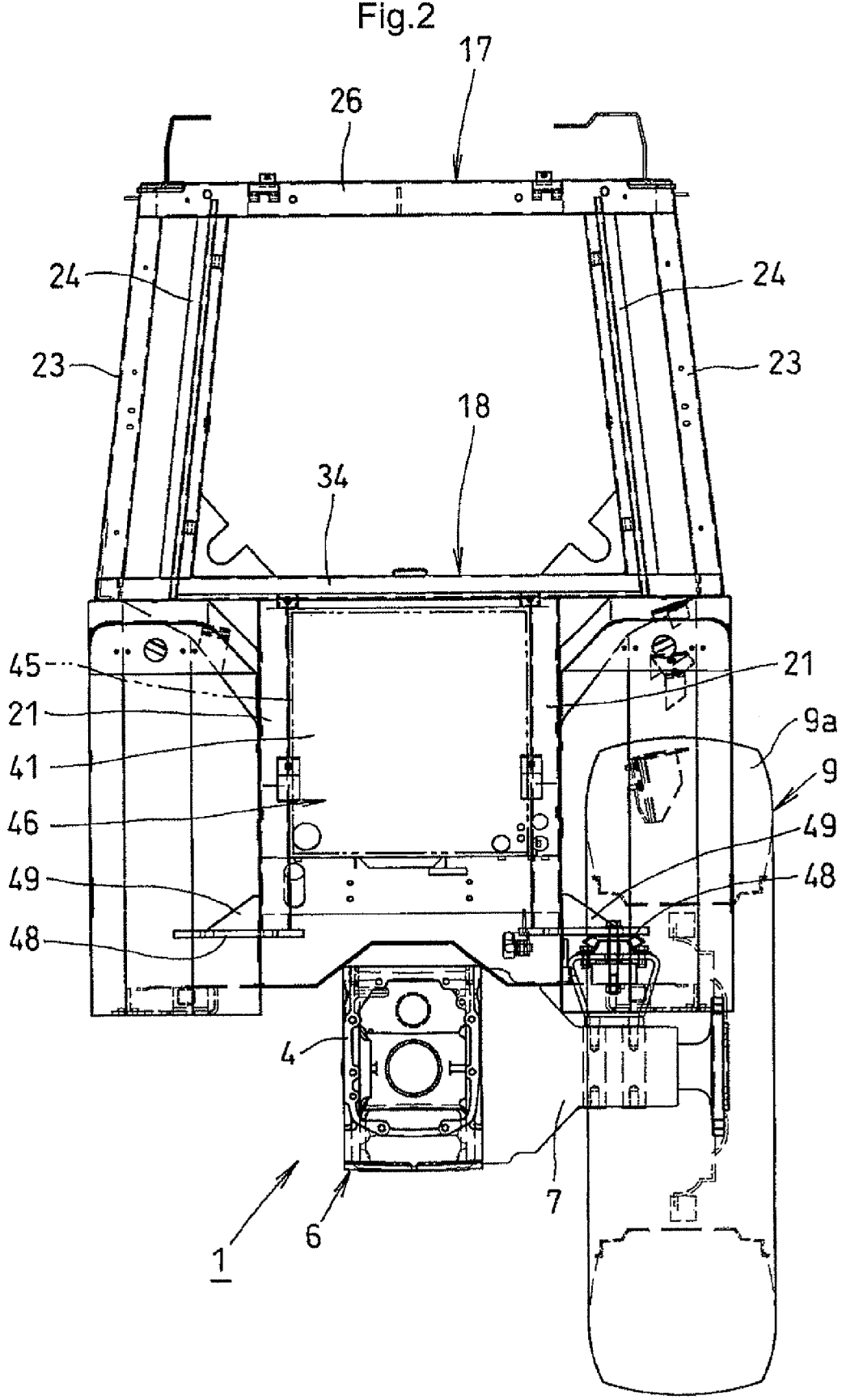
FIG. 2 is a rear view of the rear part of the tractor.
Figure 3:
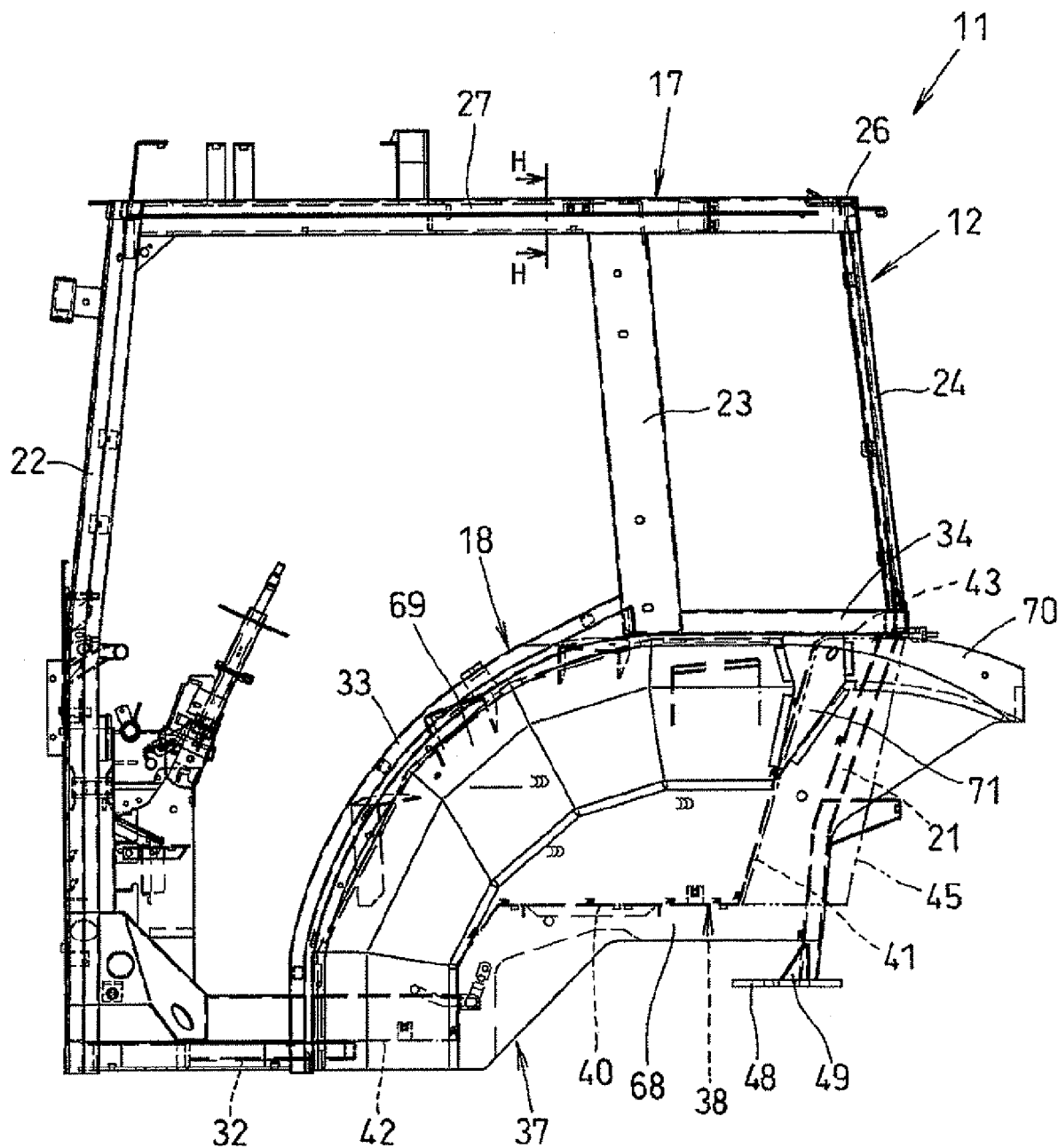
FIG. 3 is a side view of the cabin apparatus portion of the tractor.
Figure 4:
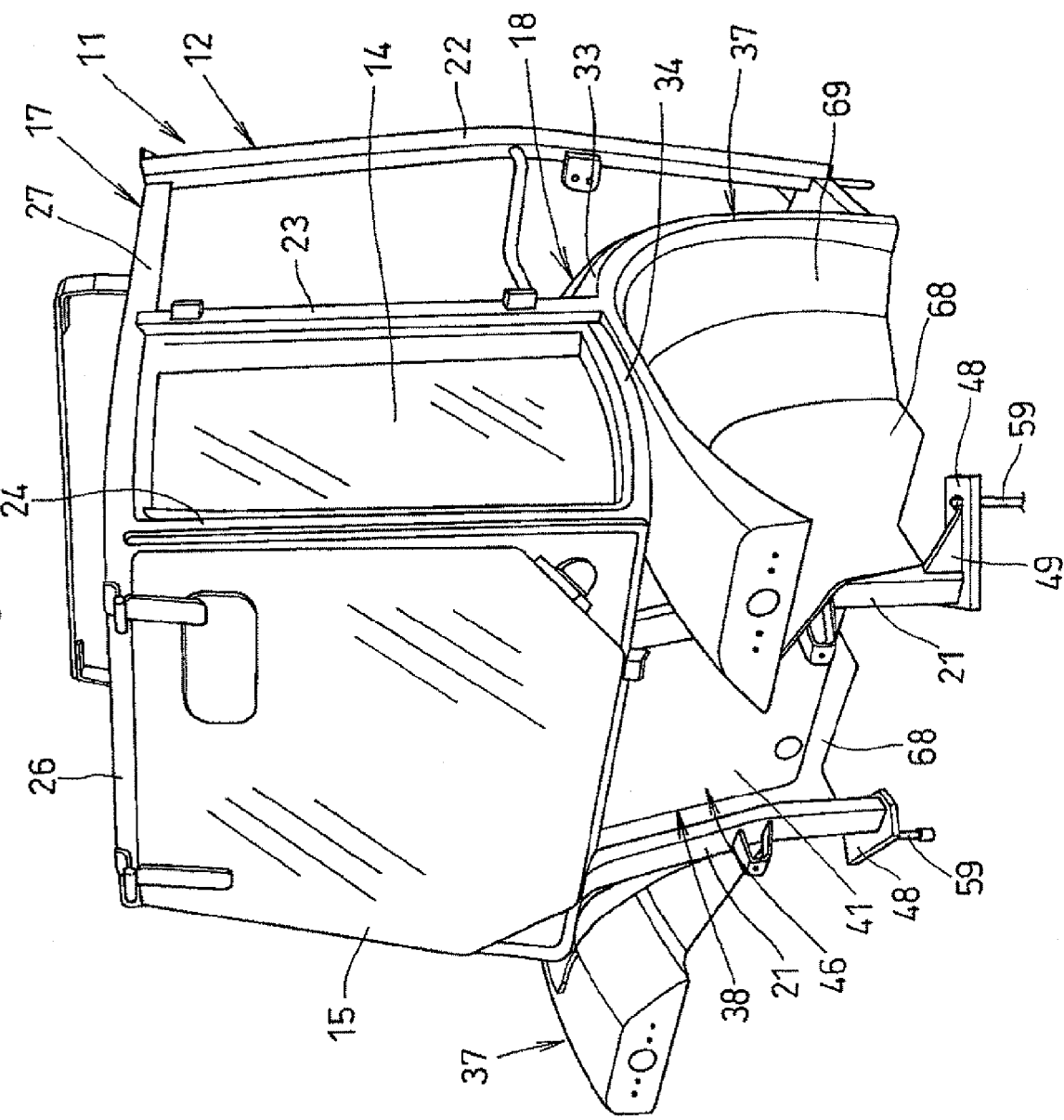
FIG. 4 is a perspective view of the cabin apparatus portion of the tractor.

1: Tractor transplanter
6: Tractor body
7: Rear axle case
9: Rear wheel
11: Cabin apparatus
12: Cabin frame
13: Vibration-proof member
15: Rear panel
17: Top frame
18: Bottom frame
22: Front brace
23: Intermediate vertical brace
24: Rear brace
37: Fender 38: Floor seat
40: Mounting part
41: Back wall part
42: Step part
43: Ceiling part
45: Fuel tank
46: Installation space
48: Mounting plate
65: Stopper piece
68: Side plate
69: Outer peripheral covering
73: Covering main body
74: Outer wall part

DESCRIPTION OF THE PREFERRED
EMBODIMENTS

Embodiments of the present invention are described hereinbelow with reference to the drawings.

In FIG. 1, a tractor 1 has a tractor vehicle body 6 configured by directly coupling an engine, a clutch housing, a transmission case 4, and other components, wherein a hood for covering the engine and other components is provided on the front side of the tractor vehicle body 6 where a pair of left and right front wheels are supported, a pair of left and right rear wheels (vehicle wheels) 9 are supported on the rear side of the tractor vehicle body 6 via left and right rear axle cases 7, and a cabin apparatus 11 for a moving vehicle is mounted in a state of independent suspension on the rear top part of the tractor vehicle body 6.

The front part of the cabin apparatus 11 is fixedly mounted via a vibration-proof member on a support that protrudes toward the transmission case 4 and the like, and the rear part of the cabin apparatus 11 is fixedly mounted on the rear axle cases 7 via vibration-proof members 13, as will be described hereinafter.

In FIGS. 1 through 7, the cabin apparatus 11 comprises a cabin frame 12 having a boxed frame shape that serves as a framework. Mounted on the cabin frame 12 are a front panel, a door panel, a back side panel 14, a rear panel 15, a roof, and other components.

Figure 8:
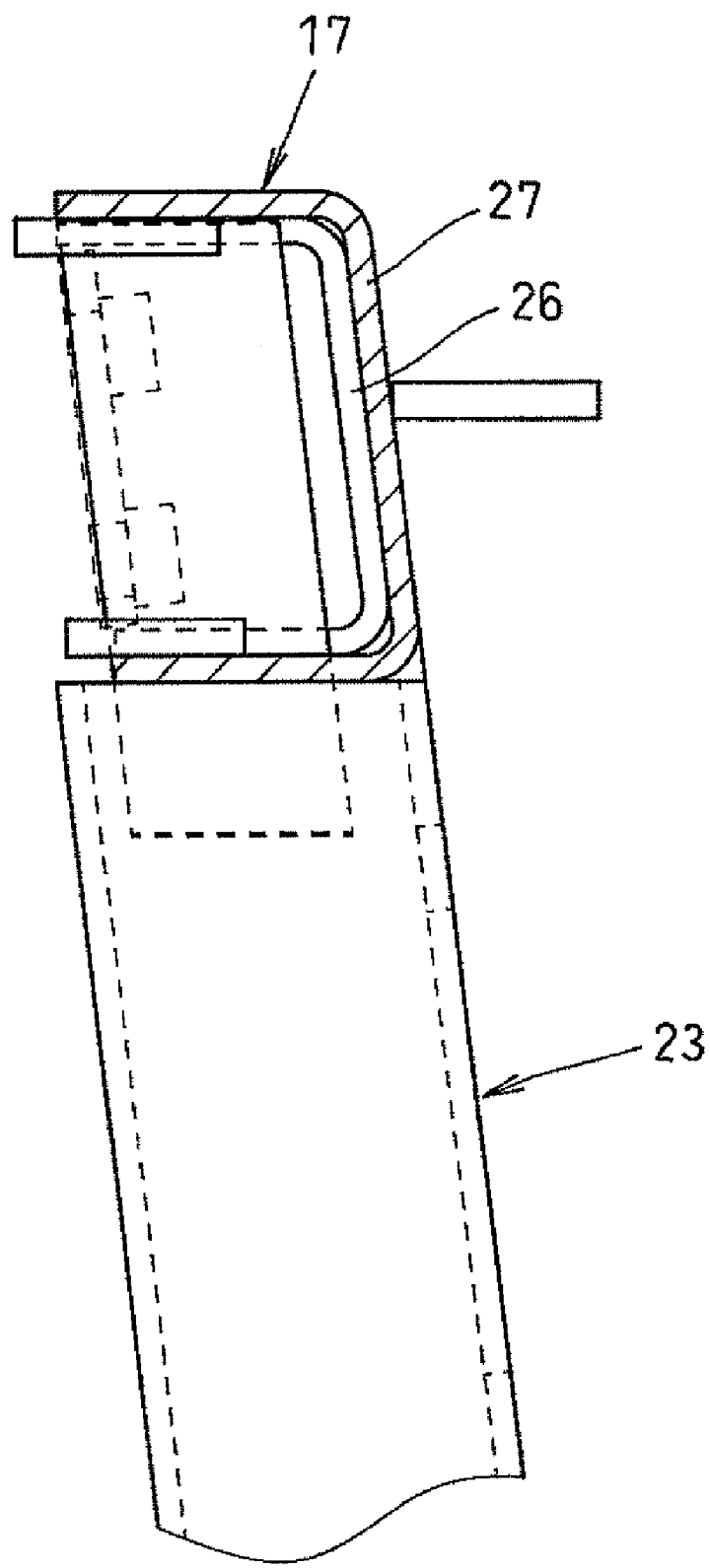
FIG. 8 is a cross-sectional view along line H-H in FIG. 3.
Figure 9:
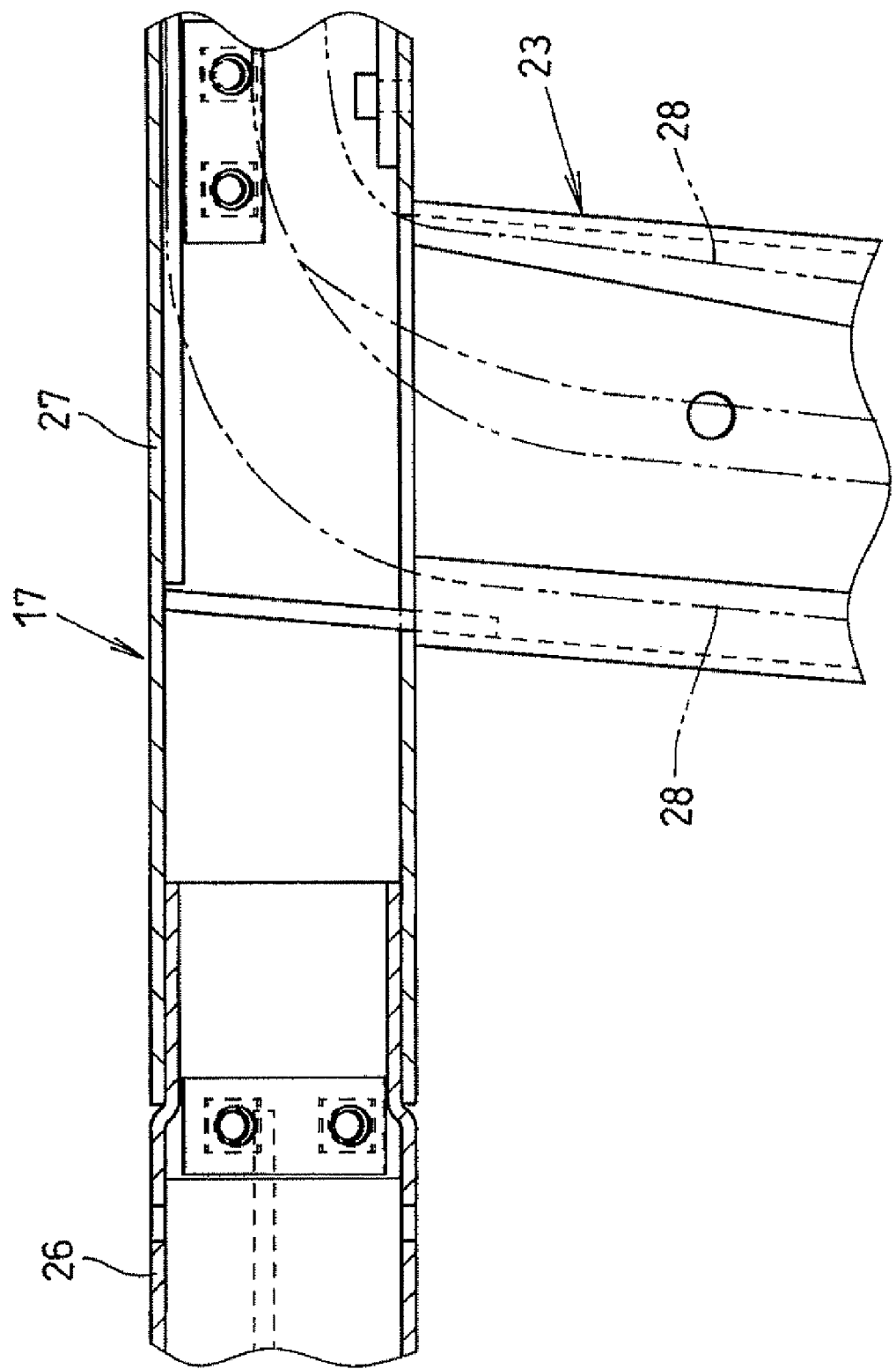
FIG. 9 is a cross-sectional side view of a top side beam, a top rear beam, and an intermediate vertical brace portion of the cabin apparatus.
Figure 10:
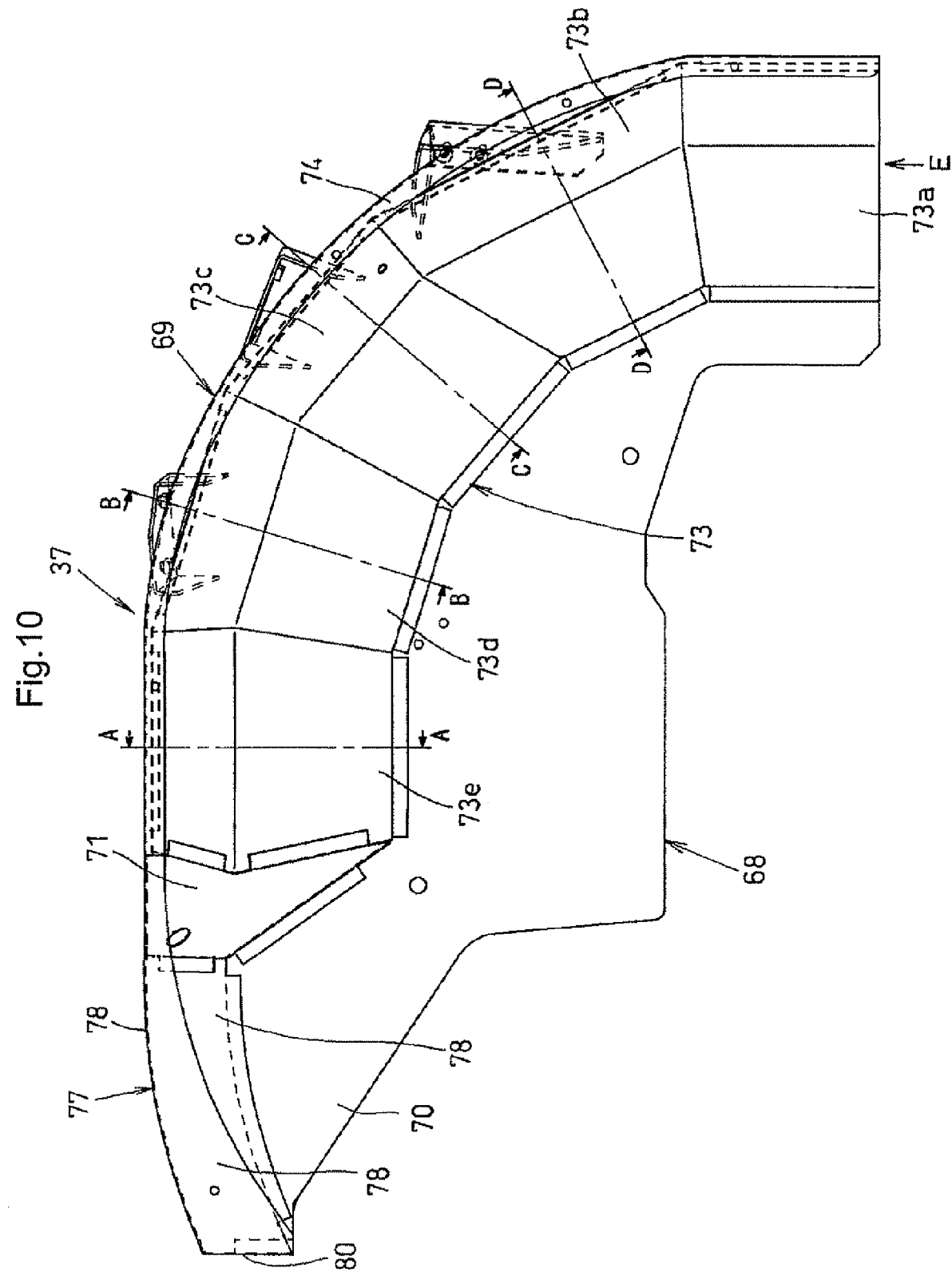
FIG. 10 is a side view of a rear wheel fender.
Figure 11:
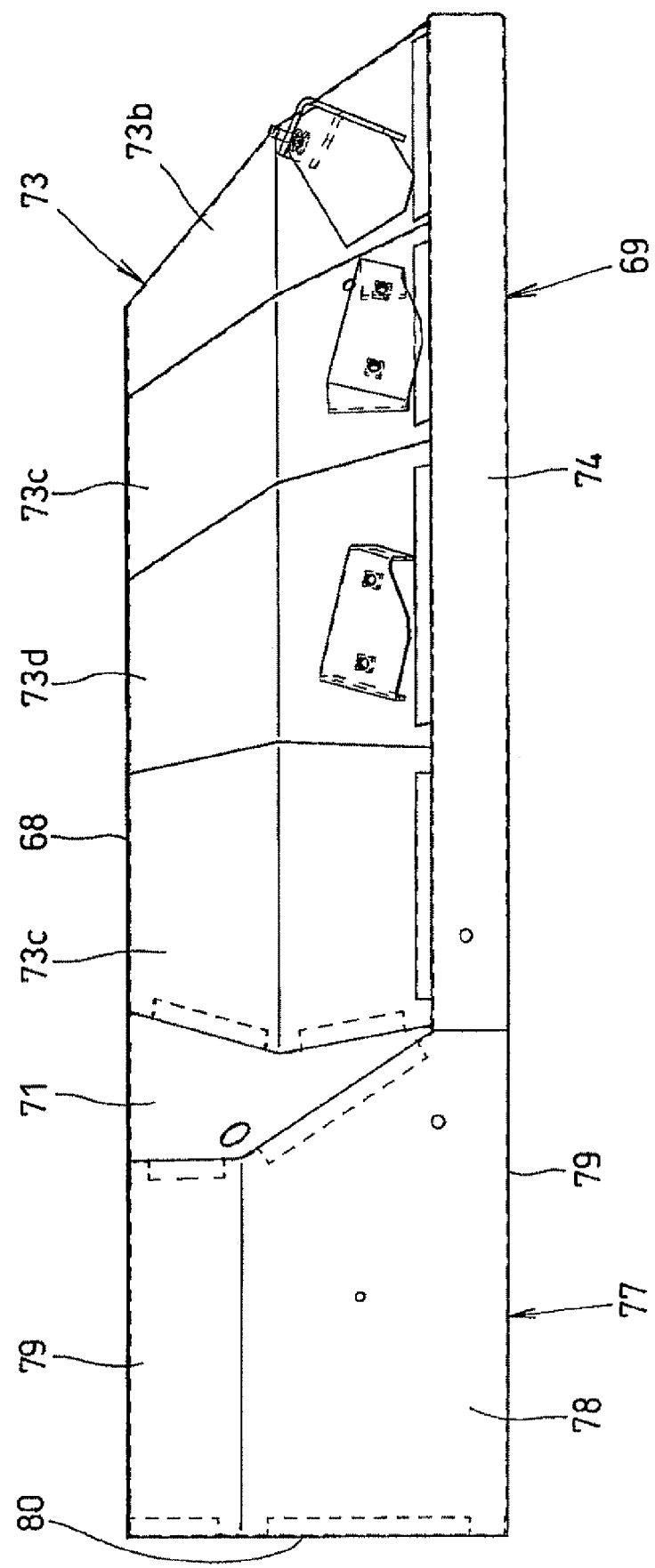
FIG. 11 is a plan view of a rear wheel fender.
Figure 12:
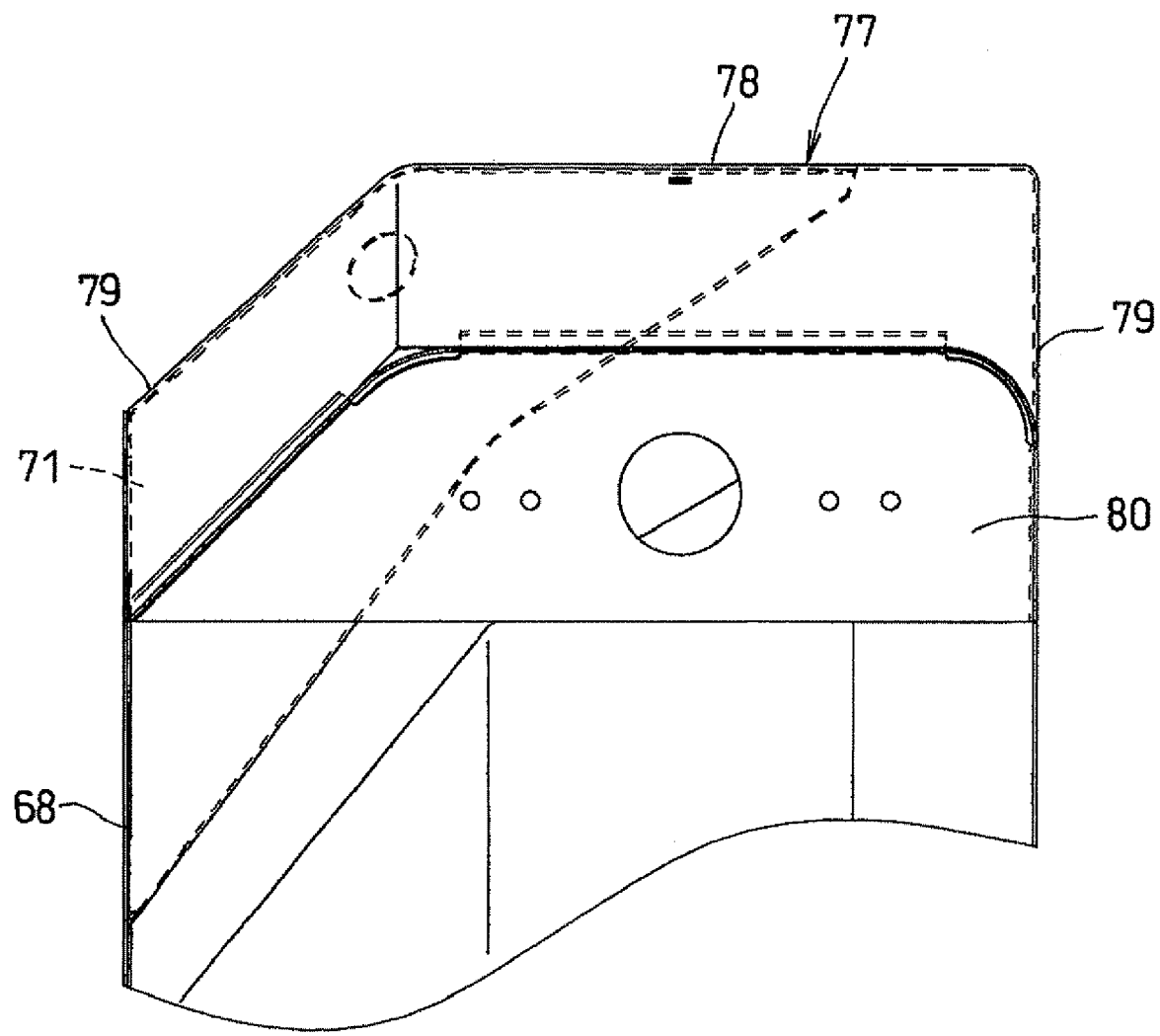
FIG. 12 is a rear view of a top end of a rear wheel fender.
Figure 13:
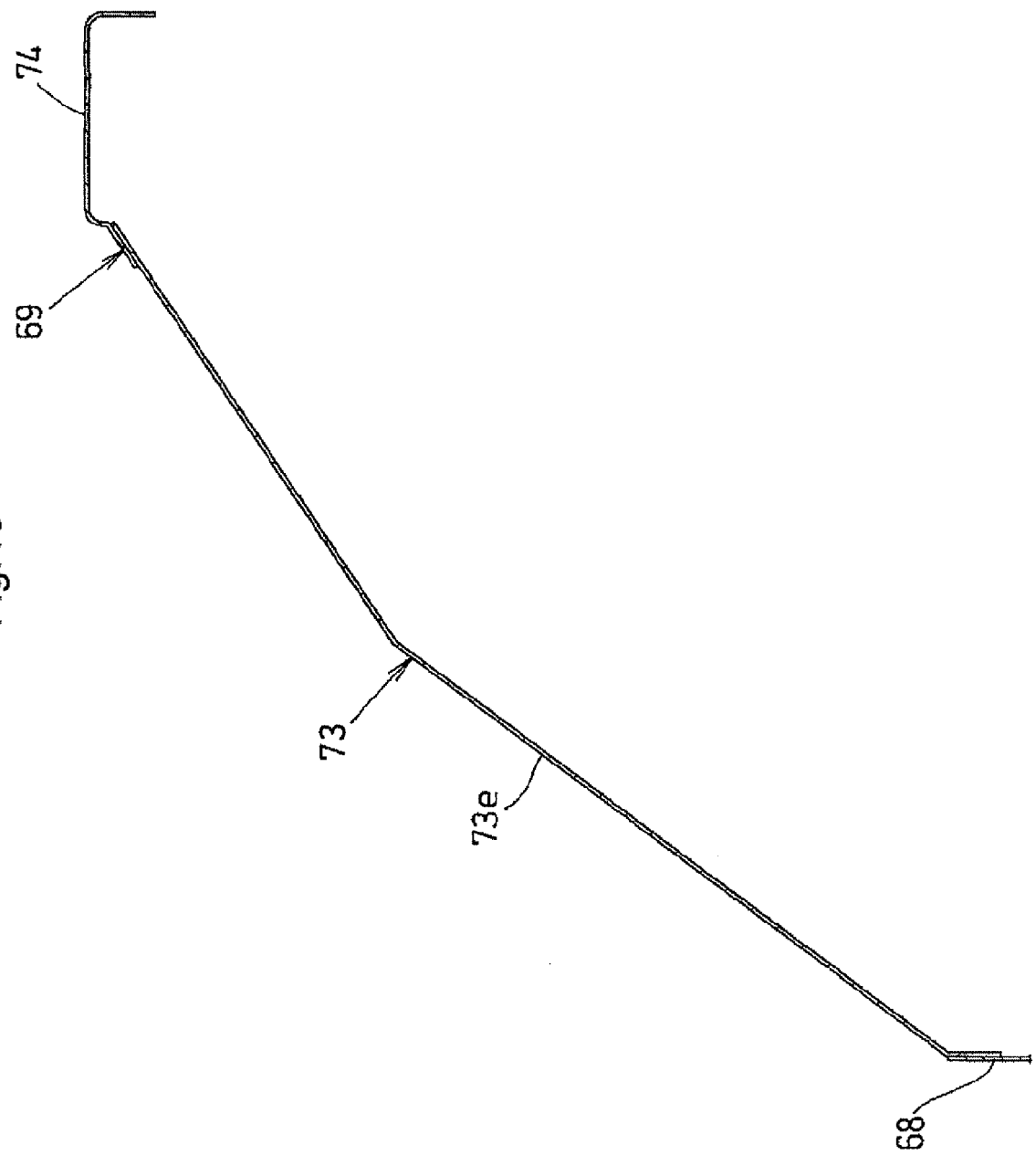
FIG. 13 is a cross-sectional view along line A-A in FIG. 10.
Figure 14:
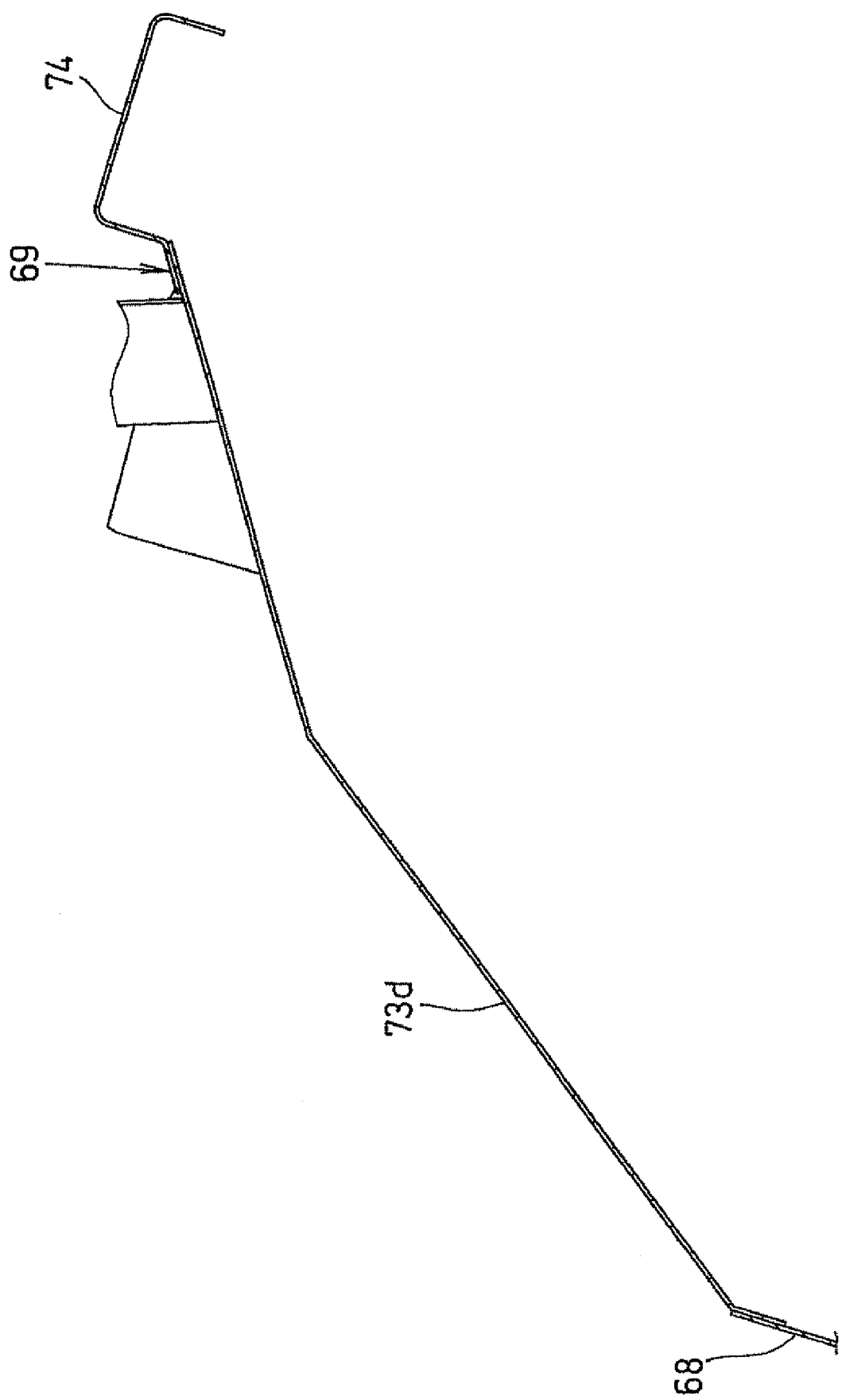
FIG. 14 is a cross-sectional view along line B-B in FIG. 10.
Figure 15:
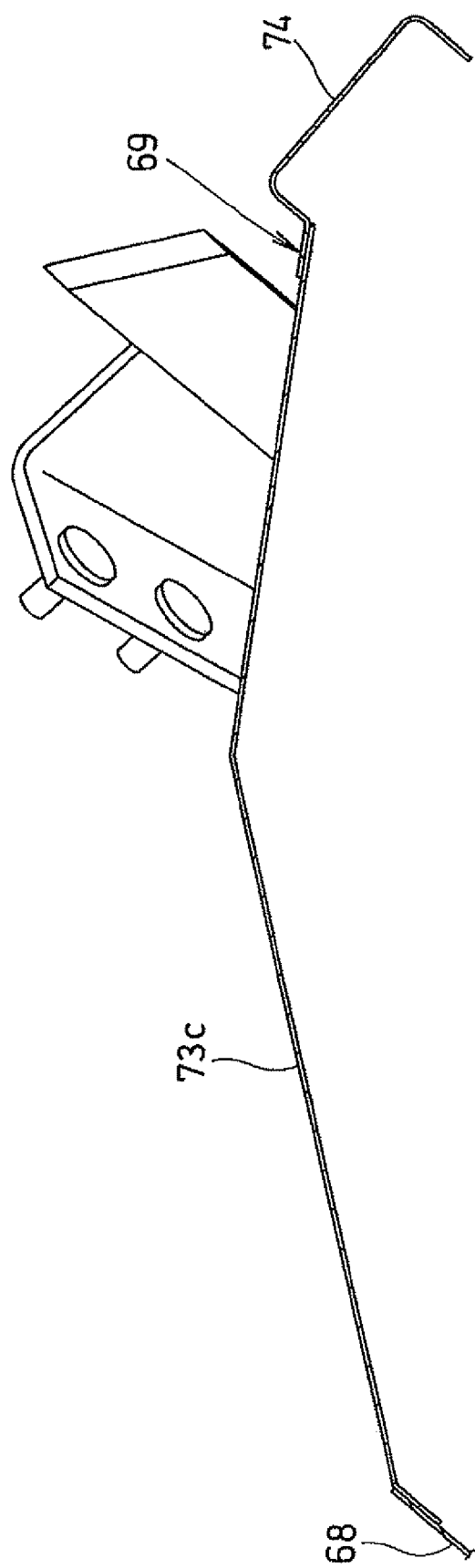
FIG. 15 is a cross-sectional view along line C-C in FIG. 10.
Figure 16:
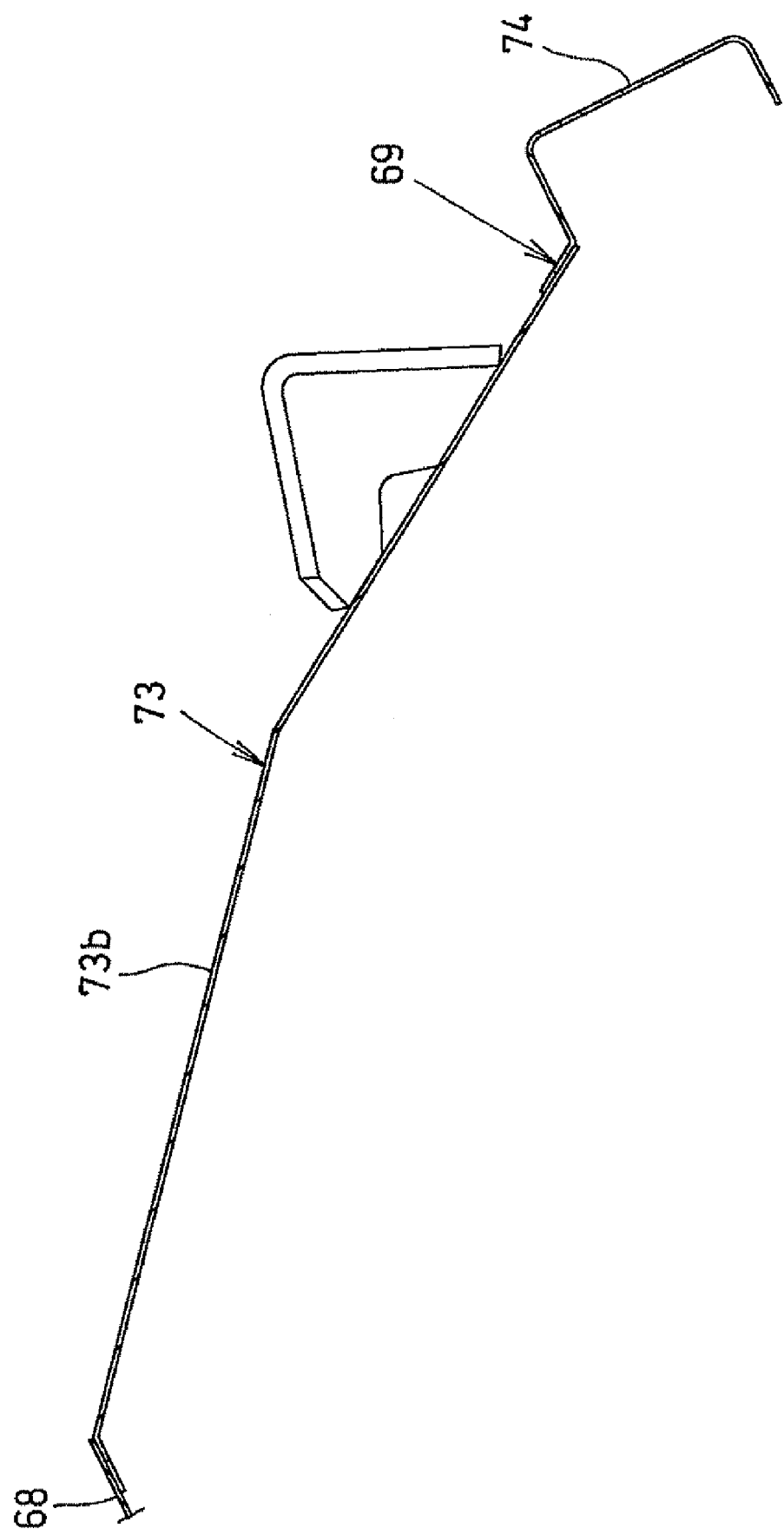
FIG. 16 is a cross-sectional view along line D-D in FIG. 10.
Figure 17:
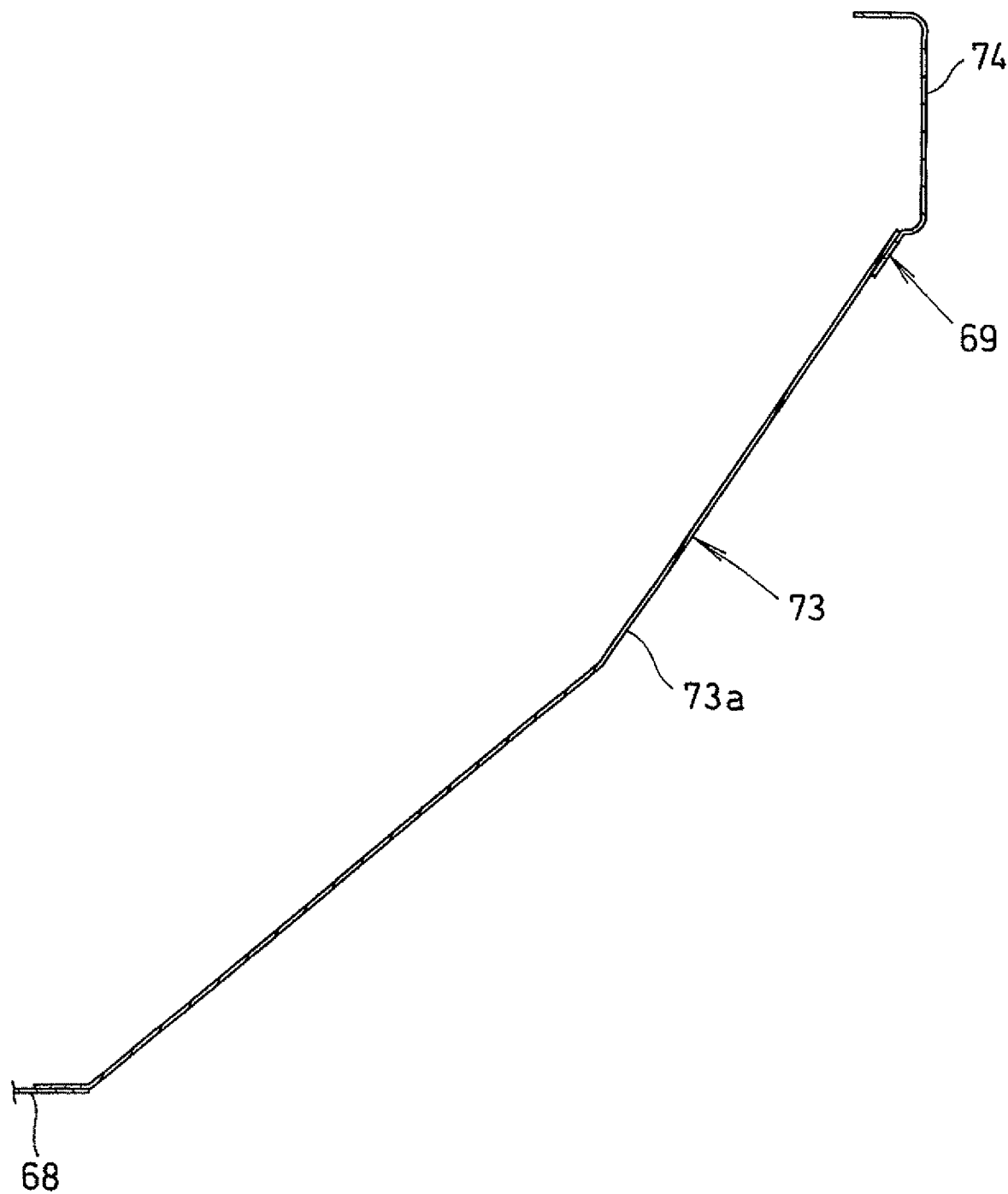
FIG. 17 is a view as indicated by arrow E in FIG. 10.

The cabin frame 12 has a top frame 17, a bottom frame 18, a pair of left and right front braces 22, a pair of left and right rear braces 24, a pair of left and right intermediate vertical braces 23, and a pair of left and right mounting braces 21. The top frame 17 and the bottom frame 18 are connected by the pair of left and right front braces 22 and the pair of left and right rear braces 24; the top frame 17 and the bottom frame 18 are also connected between the pair of left and right front braces 22 and the pair of left and right rear braces 24 by the pair of left and right intermediate vertical braces 23; and a vertical brace section is configured from the pair of left and right front braces 22, the pair of left and right intermediate vertical braces 23, and the pair of left and right rear braces 24. The pair of left and right mounting braces 21 extends downward from the rear part of the bottom frame 18. The pair of left and right intermediate vertical braces 23 is configured by a channel member which has a C-shape in cross section and whose transverse inner sides are open; an air hose 28 or electrical wiring is disposed within the intermediate vertical braces 23; and through this air hose 28 or electrical wiring, either heating and cooling air from an air conditioner in the ceiling of the cabin apparatus 11 is delivered into the cabin apparatus 11, or electricity is supplied to the ceiling of the cabin apparatus 11, as shown in FIGS. 8 and 9.

The top frame 17 is configured from a top front beam 25 for connecting the top ends of the pair of left and right front braces 22 together, a U-shaped top rear beam 26 for connecting the top ends of the pair of left and right rear braces 24 at a midway part, and a pair of left and right top side beams 27 for connecting the top ends of the front braces 22 and the intermediate vertical braces 23 that are on the same left or right side. The pair of left and right front ends of the top rear beam 26 and the rear ends of the pair of left and right top side beams 27 are fitted together and are fixed to each other by welding or another means, as shown in FIGS. 8 and 9.

The bottom frame 18 has bottom front members protruding inward to the left and right from the bottom ends of the pair of left and right front braces 22, a pair of left and right bottom side members 32 protruding backward from the bottom ends of the pair of left and right front braces 22, a pair of left and right fender support members 33 connected respectively between the rear ends of the pair of left and right bottom side members 32 and the bottom ends of the pair of left and right intermediate vertical braces 23, and a bottom rear member 34 which connect the bottom ends of the pair of left and right intermediate vertical braces 23 together and at which the bottom ends of the pair of left and right rear braces 24 connect to the midway part.

A pair of left and right rear wheel fenders 37 is provided on the bottom side of the bottom frame 18 of the cabin frame 12, and a floor seat 38 is provided between the pair of left and right rear wheel fenders 37. The pair of left and right rear wheel fenders 37 is connected by welding or another means to the respective fender support members 33 of the bottom frame 18.

The floor seat 38 has a mounting part 40 for mounting a driver seat, a back wall part 41 erected upward from the rear end of the mounting part 40, and a step part 42 protruding forward from the mounting part. A driver seat support stand is mounted on the top of the mounting part, and a driver seat (not shown) is mounted on the top of the driver seat support stand.

Figure 5:
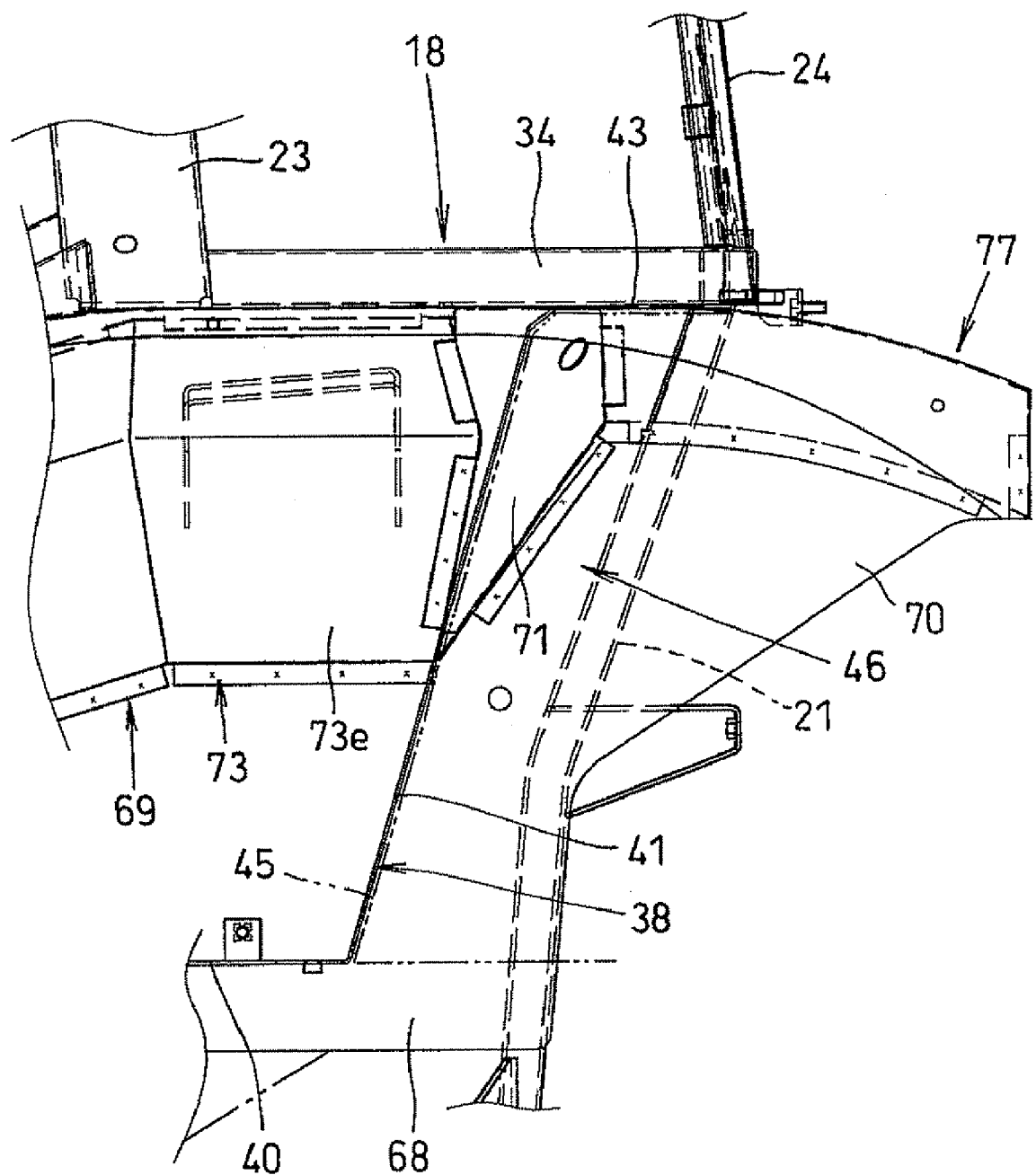
FIG. 5 is a side view of the seat and the rear part of a fender.
Figure 7:
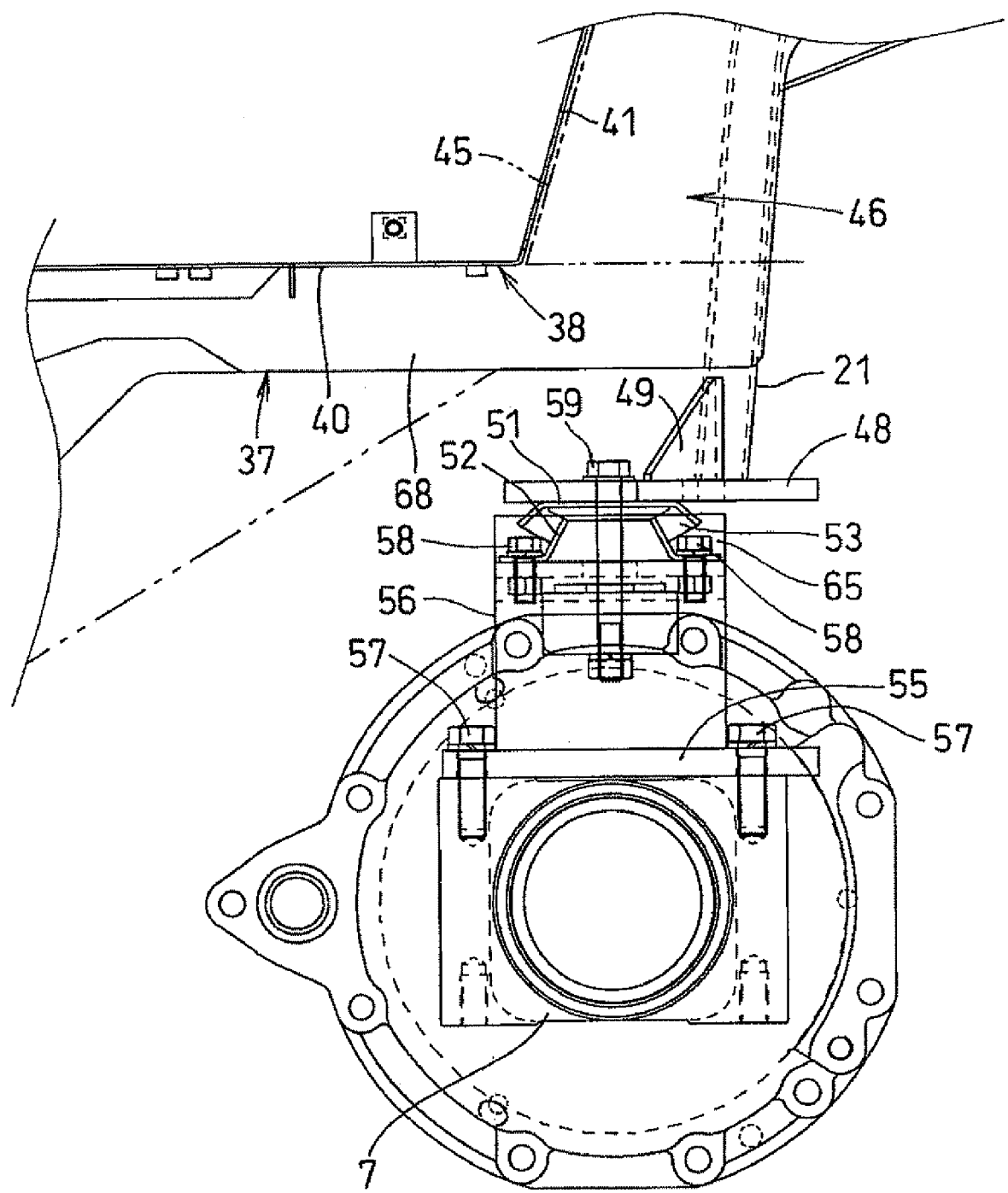
FIG. 7 is a side view of a mounting plate, a vibration-proof member, and a rear axle case portion.

The back wall part 41 of the floor seat 38 is disposed vertically oriented at a position recessed farther forward than the pair of left and right mounting braces 21, as shown in FIGS. 5 and 7. A ceiling part 43 is provided extending backward from the top end of the back wall part 41 of the floor seat 38, the ceiling part 43 is disposed along the bottom surface of the rear part of the bottom frame 18 and is connected to the bottom frame 18, and the left and right ends of the back wall part 41 are connected by welding or another method to the pair of left and right rear wheel fenders 37, respectively. The ceiling part 43 of the floor seat 38 is set at substantially the same height as the top ends at the rear of the rear wheel fenders 37, and the left and right ends of the ceiling part 43 are connected by welding or another method to the top ends at the rear of the rear wheel fenders 37. An installation space 46 for a fuel tank 45 is provided below the ceiling part 43, and the installation space 46 for the fuel tank 45 extends from the rear surface side of the back wall part 41 of the floor seat 38 to the space between the pair of left and right mounting braces 21. Therefore, the installation space 46 of the fuel tank 45 is provided below the ceiling part 43 and between the rear parts of the pair of left and right rear wheel fenders 37. The rear panel 15 is provided between the pair of left and right rear braces 24 of the cabin frame 12, and the installation space 46 for the fuel tank 45 is positioned below the rear panel 15.

Figure 6:
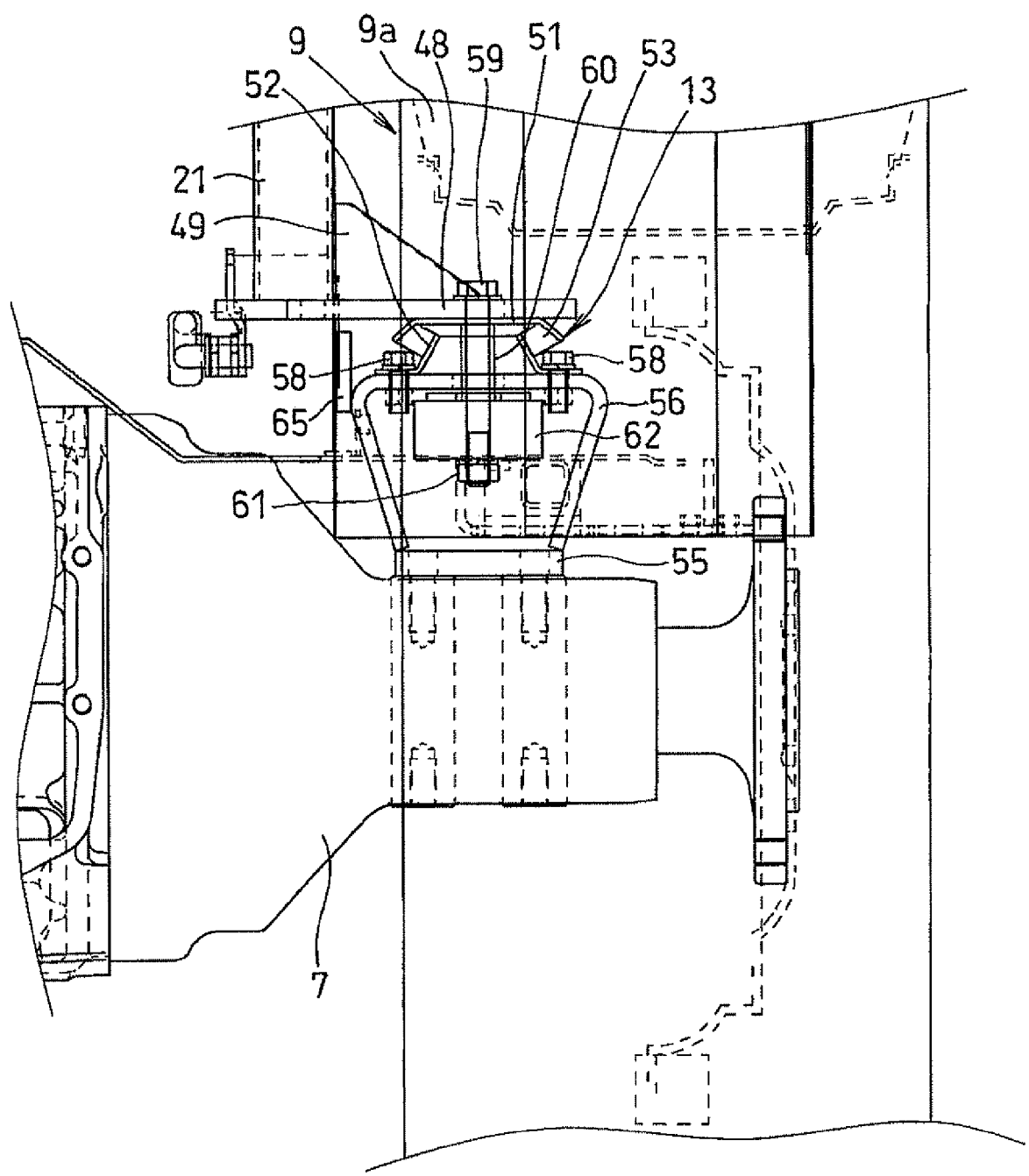
FIG. 6 is a rear view of a mounting plate, a vibration-proof member, and a rear axle case portion.

A pair of left and right mounting plates 48 protruding outward to the left and right is provided to the bottom ends of the pair of left and right mounting braces 21, as shown in FIGS. 6 and 7. The pair of left and right mounting plates 48 are made to protrude outward to the left and right in a state of being inclined forward so as to face progressively farther forward as they extend outward to the left and right from the bottom ends of the mounting braces 21, and the outer end sides of the mounting plates 48 are inserted through the inner peripheral sides of tires 9*a* of the rear wheels 9. Reinforcing members 49 are provided between each pair of left and right mounting braces 21 and each pair of left and right mounting plates 48, and the reinforcing members 49 are fixed by welding or another method to the mounting braces 21 and the mounting plates 48, creating reinforcement so that the mounting plates 48 do not accidentally separate from the mounting braces 21. On the inner peripheral sides of the tires 9*a* of the rear wheels 9, the pair of left and right mounting plates 48 is fixedly mounted to the left and right rear axle cases 7, respectively, via the elastic vibration-proof members 13, whereby the rear side of the cabin frame 12 is supported on the tractor vehicle body 6.

The vibration-proof members 13 comprise top clamping bodies 51, bottom clamping bodies 52, and annular vibration-proof rubber elements 53 clamped by the clamping bodies 51, 52. The top clamping bodies 51 are formed from iron plates or the like into ring shapes in which the outer peripheries are conical and the centers are planar, the bottom clamping bodies 52 are formed from iron plates or the like into ring shapes in which the outer peripheries are planar and the centers protrude upward in conical shapes, and the vibration-proof rubber elements 53 are clamped between the outer peripheries of the top clamping bodies 51 and the centers of the bottom clamping bodies 52. The vibration-proof members 13 are mounted by bolt and nuts or the like on holding stands 56, which are fixedly installed on the rear axle cases 7 via mounting members 55.

The mounting members 55 are fixed to the rear axle cases 7 by bolts or other fixing tools 57, and the holding stands 56 are fixed to the mounting members 55 by welding or another means and are mounted in an upward protruding manner on the rear axle cases 7.

The outer peripheries of the bottom clamping bodies 52 of the vibration-proof members 13 are placed on the holding stands 56 and are fixed to the holding stands 56 by bolts and nuts or other fastening tools 58, whereby the bottom clamping bodies 52 are fixedly mounted on the holding stands 56. Bolts 59 are inserted from the outer ends of the mounting plates 48 through the centers of the top clamping bodies 51, the vibration-proof rubber elements 53, the bottom clamping bodies 52, and the holding stands 56; cylindrical tubes 60 fitted over the bolts 59 are inserted through the centers of the vibration-proof rubber elements 53, the bottom clamping bodies 52, and the holding stands 56; nuts 61 are threaded over the distal ends of the bolts 59; parallelepiped elastic bodies 62 or the like are placed between the holding stands 56 and the nuts 61 and are fitted over the bolts 59; and the nuts 61 are fastened over the bolts 59, thereby fastening and fixing the top clamping bodies 51 in place on the bottom surfaces of the mounting plates 48 via the elastic bodies 62 and the tubes 60.

Most of the components, including the vibration-proof members 13, the mounting members 55, the holding stands 56, the fixing tools 57, the fastening tools 58, the bolts 59, the tubes 60, the nuts 61, and other components, are disposed inward along the diametral directions of the inner peripheries of the tires 9*a* of the rear wheels 9; and the pair of left and right mounting plates 48 is fixedly mounted on the rear axle cases 7 at the inner peripheries of the tires 9*a* of the rear wheels 9, as is described above.

The left and right rear axle cases 7 are provided with stopper pieces 65 protruding toward the mounting plates 48 so as to restrict the mounting plates 48 from vibrating up and down. The stopper pieces 65 are provided protruding upward from the transverse inside ends of the top ends of the holding stands 56, the bottom ends of the stopper pieces 65 are fixed by welding or another means to the holding stands 56, and the top ends of the stopper pieces 65 approach the transversely (longitudinally) midway parts of the mounting plates 48 from below.

In the pair of left and right rear wheel fenders 37, side plates 68 for covering the transversely inner sides of the rear wheels (vehicle wheels) 9, and outer peripheral coverings 69 for covering the outer peripheries of the rear wheels 9, are formed separately and are connected together by welding or another means; protruding plates 70 which protrude backward and upward are integrally provided to the rear parts of the side plates 68; and blocking plates 71 are provided between the rear ends of the outer peripheral coverings 69 and the protruding plates 70 of the side plates 68 so as to block off the spaces between the outer peripheral coverings 69 and the protruding plates 70. The side plates 68 and the blocking plates 71 are both formed by bending a flat plate, the front end sides of the blocking plates 71 are connected by welding or another means to the outer peripheral coverings 69, and the rear end sides of the blocking plates 71 are connected to the protruding plates 70.

The covering main bodies 73 and outer wall parts 74 on the transversely outer ends in the outer peripheral coverings 69 are configured separately and are connected together by welding or another means; the covering main bodies 73 are configured by bonding and welding five plate members 73*a*, 73*b*, 73*c*, 73*d*, 73*e*; and the plate members 73*a*, 73*b*, 73*c*, 73*d*, 73*e* are formed by bending a plate member. In the covering main bodies 73, the plate members 73*a*, 73*b*, 73*c*, 73*d*, 73*e* are all sequentially curved at intervals in the circumferential direction along the outer peripheries of the rear wheels 9; and the plate members 73*a*, 73*b*, 73*c*, 73*d*, 73*e* are curved in V-shapes in the transversely middle parts of the covering main bodies 73. The outer wall parts 74 are formed by drawing sheet metal or the like, then are curved in arcuate shapes along the outer peripheries of the rear wheels 9, and are made to bulge in U-shapes outward in the diametral directions of the rear wheels 9 from the covering main bodies 73.

Protruding walls 77, which protrude backward from the bottom frame 18 of the cabin frame 12, are provided at the top ends of the rear parts of the rear wheel fenders 37; the protruding walls 77 are formed by drawing sheet metal or the like; and the protruding walls 77 have horizontal top plates 78, a pair of left and right bent plates 79 that are bent downward from the left and right ends of the top plates 78, and rear plates 80 that are bent downward from the rear ends of the top plates 78. The bottom ends of the bent plates 79 on the transversely outer sides of the protruding walls 77 are connected to the top ends of the protruding plates 70 of the side plates 68; the rear ends of the bent plates 79 on the transversely outer sides of the protruding walls 77 are connected to the rear ends at the top parts of the blocking plates 71; and the rear ends of the top plates 78 of the protruding walls 77, as well as the rear ends of the bent plates 79 at the transversely inner sides, are connected to the rear ends of the outer wall parts 74 of the outer peripheral coverings 69.

According to the embodiment described above, the back wall part 41 of the floor seat 38 is disposed vertically at a position recessed farther forward than the pair of left and right mounting braces 21, and the space extending from the rear surface of the back wall part 41 of the floor seat 38 up to between the pair of left and right mounting braces 21 is used as an installation space 46 for a fuel tank 45. Therefore, sufficient space for the fuel tank 45 can be ensured to dispose the fuel tank 45 behind the back wall part 41 of the floor seat 38. This can be achieved even if the pair of left and right mounting braces 21 is brought nearer to the center of the tractor vehicle body 6 in the transverse direction and the transverse width between the pair of left and right mounting braces 21 is narrowed. Moreover, the rearward bulge of the fuel tank 45 from the cabin apparatus 11 can be reduced, and the fuel tank 45 is not a hindrance to work and the like at the rear of the tractor 1. Even if the pair of left and right mounting braces 21 is brought nearer to the center of the tractor vehicle body 6 in the transverse direction, the rigidity of the cabin apparatus 11 is not compromised, owing to the box shape of the installation space 46 for the fuel tank 45 at the rear part of the cabin apparatus 11. Specifically, the ceiling part 43 is provided protruding backward from the top end of the back wall part 41 of the floor seat 38; the ceiling part 43 is disposed close to the bottom surface of the rear part of the bottom frame 18 and is connected to the bottom frame 18; and either the left and right ends of the back wall part 41 are connected to the pair of left and right fenders 37, respectively, or the ceiling part 43 of the floor seat 38 is set at substantially the same height as the top ends of the rear parts of the fenders 37, and the left and right ends of the ceiling part 43 are connected to the top ends of the rear parts of the fenders 37, whereby the rigidity of the cabin apparatus 11 will no longer be compromised and sufficient rigidity can be ensured in the cabin apparatus 11.

Since the pair of left and right mounting braces 21 can be brought nearer to the center of the tractor vehicle body 6, the width by which the rear wheels 9 are accommodated by the pair of left and right rear wheel fenders 37 can be increased. As a result, the rear wheels 9 can be brought nearer to the center of the tractor vehicle body 6, the transverse width of the tractor vehicle body 6 can be made much narrower, and the tractor 1 can be made suitable for management work in orchards and the like.

According to the embodiment described above, the covering main bodies 73 and the outer wall parts 74 on the transversely outer sides in the outer peripheral coverings 69 are configured separately and connected together; the covering main bodies 73 are configured by bonding and welding the five plate members 73a, 73b, 73c, 73d, 73e together; the plate members 73a, 73b, 73c, 73d, 73e are formed by bending a flat plate; the plate members 73a, 73b, 73c, 73d, 73e in the covering main bodies 73 are all sequentially curved at intervals in the circumferential direction along the outer peripheries of the rear wheels; and the plate members 73a, 73b, 73c, 73d, 73e are curved in V-shapes in the transversely middle parts of the covering main bodies 73. Therefore, tooling costs stay low in comparison with conventional practice in which the rear wheel fenders 37 would be configured by integral pressing, forming, or by integral bending. Specifically, for example, the size and shape of the fenders would differ with each specification that has a different dimension between the fenders in a conventional configuration such as is described above. Therefore, different models would be needed, and if the bending of integrated members were employed, large sizes would lead to increases in tooling costs and other drawbacks. With the configuration of the present application, however, there are no such problems, the investments in models can be reduced, and the configuration can be easily adapted to specifications for fenders of different widths and the like.

According to the embodiment described above, the pair of left and right mounting plates 48 protruding transversely outward is provided at the bottom ends of the pair of left and right mounting braces 21, and the outer ends of the pair of left and right mounting plates 48 are fixedly mounted on the respective left and right rear axle cases 7 so as to support the rear part of the cabin frame 12 on the tractor vehicle body 6.

Therefore, even if the transverse width of the cabin apparatus 11 is formed to be narrow, the rear part of the cabin apparatus 11 can be prevented from widely vibrating or swinging to the left or right, and the cabin apparatus 11 can be installed stably. The pair of left and right mounting plates 48 are also fixedly mounted on the respective left and right rear axle cases 7 via the elastic vibration-proof members 13, and the stopper pieces 65 protruding toward the mounting plates 48 are provided to the sides of the left and right rear axle cases 7 so as to restrict the vertical vibration of the mounting plates 48; therefore, when the vibration-proof rubber elements 53 are deformed by a load, and the cabin frame 12 moves down to some degree, the mounting plates 48 come in contact with the stopper pieces 65 and inhibit the downward movement of the cabin frame 12. The result is that the cabin apparatus can be prevented from widely vibrating or swinging by the stopper pieces 65.

In the embodiment previously described, the present invention was applied and carried out in a tractor, but, alternatively, the present invention may also be applied and carried out in a backhoe and other moving vehicle. The cabin apparatus to which the present invention is applied is not limited to the apparatus of the embodiment previously described, and may also be a cabin apparatus which has no intermediate vertical braces 23, for example.

What is claimed is:

1. A cabin apparatus for a work vehicle provided with a pair of left and right rear axle cases, comprising:
    a cabin frame (12), including;
    a top frame (17);
    a bottom frame (18);
    a pair of left and right front braces (22), one set of ends of the front braces (22) being connected to the top frame (17), and the other set of ends being connected to the bottom frame (18);
    a pair of left and right rear braces (24), one set of ends of the rear braces (24) being connected to the top frame (17), and the other set of ends being connected to the bottom frame (18);
    a pair of left and right mounting braces (21), the mounting braces (21) extending downward from the rear part of the bottom frame (18);
    a pair of left and right mounting plates (48), the mounting plates (48) being provided respectively to the bottom ends of the pair of left and right mounting braces (21) and protruding outward to the left and right; and
    a pair of left and right mounting members (55) provided to the respective left and right rear axle cases (7), wherein
    the pair of left and right mounting members (55) is fixed to the rear axle cases (7) by inserting bolts through the mounting members 55 and the rear axle cases (7), respectively;
    the bottom frame (18) includes: a pair of left and right first portions (32) extending rearward from the respective front braces (22); a pair of left and right second portions (33) extending rearward and upward from the first portions (32) along left and right rear fenders (37), respectively; and a pair of left and right third portions (34) extending rearward from the respective second portions, the mounting braces (21) extending downward from rear ends or their vicinity of the respective third portions (34); and
    the pair of left and right mounting plates (48) extend laterally outward from the respective mounting braces (21) with a forward inclination to extend gradually forward as the mounting braces (21) lie forward, and the pair of left and right mounting plates (48) are fixedly mounted to the respective left and right rear axle cases (7) via the respective left and right mounting members (55) in order to support the rear part of the cabin frame (12) on a vehicle body (6) of the work vehicle.

2. The cabin apparatus of claim 1, further comprising vibration-proof members (13) having elasticity; wherein
the pair of left and right mounting plates (48) is fixedly mounted on the respective left and right rear axle cases (7) via the vibration-proof members (13).

3. The cabin apparatus of claim 2, further comprising a pair of left and right stopper pieces (65); wherein
the stopper pieces protrude toward the mounting plates (48) from the sides of the rear axle cases (7) and restrict vertical vibration of the mounting plates (48).

4. A cabin apparatus for a work vehicle provided with a pair of left and right rear axle cases (7), comprising:
a cabin frame (12), including:
a top frame (17);
a bottom frame (18);
a pair of left and right front braces 22, one set of ends of the front braces 22 being connected to the top frame (17), and the other set of ends being connected to the bottom frame (18);
a pair of left and right rear braces 24, one set of ends of the rear braces (24) being connected to the top frame (17), and the other set of ends being connected to the bottom frame (18);
a pair of left and right mounting braces (21), the mounting braces (21) extending downward from the rear part of the bottom frame (18); and
a pair of left and right mounting plates (48), the mounting plates (48) being provided respectively to the bottom ends of the pair of left and right mounting braces (21) and protruding outward to the left and right,
wherein
the bottom frame (18) includes: a pair of left and right first portions (32) extending rearward from the respective front braces (22); a pair of left and right second portions (33) extending rearward and upward from the first portions (32) along left and right rear fenders (37), respectively; and a pair of left and right third portions (34) extending rearward from the respective second portions (33), the mounting braces (21) extending downward from rear ends of their vicinity of the respective third portions (34); and
wherein
outer ends of the pair of left and right mounting plates (48) enter respective inner walls of tires (9a) of vehicle wheels (9) and the pair of left and right mounting plates (48) extend laterally outward from the respective mounting braces (21) with a forward inclination to extend gradually forward as the mounting braces (21) lie forward, the outer ends of the pair of left and right mounting plates (48) overlapping the respective tires (9a) of the vehicle wheels (9) as viewed from above and are fixedly mounted on the respective left and right rear axle cases (7) in order to support the rear part of the cabin frame (12) on a vehicle body (6) of the work vehicle.

5. The cabin apparatus of claim 1, wherein
the bottom frame (18) further includes a fourth portion extending in the transverse direction and interconnecting the pair of left and right third portions (34), the mounting braces (21) extending downward from portions of the fourth portion adjacent the left and right third portions (34), respectively.

6. The cabin apparatus of claim 4, further comprising:
a pair of left and right mounting members (55) provided to the respective left and right rear axle cases (7); wherein
the pair of left and right mounting members (55) enter the inner walls of the tires (9a) of the vehicle wheels (9) and are fixed to the rear axle cases (7) by extending bolts through the mounting members (55) and the rear axle cases (7) at positions overlapping the tires (9a), respectively; and
the pair of left and right mounting plates (48) are fixedly mounted to the respective left and right rear axle cases (7) via the respective left and right mounting members (55).

7. The cabin apparatus of claim 4, further comprising:
elastic vibration-proof members (13), wherein:
the pair of left and right mounting plates (48) are fixedly mounted on the respective left and right rear axle cases (7) via the elastic vibration-proof members (13) at positions entering respective inner walls of tires (9a) of vehicle wheels (9) and overlap the tires (9a) of the vehicle wheels (9) as viewed from above.

8. The cabin apparatus of claim 7, further comprising:
stopper pieces (65) provided at positions entering respective inner walls of tires (9a) of vehicle wheels (9) and overlap the tires (9a) of the vehicle wheels (9) as viewed from above, wherein:
the stopper pieces (65) protrude toward the respective mounting plates (48) so as to restrict the respective mounting plates (48) from vibrating up and down.

* * * * *